United States Patent [19]

Buchanan

[11] Patent Number: 4,545,844
[45] Date of Patent: Oct. 8, 1985

[54] HEAT CUTTING AND SEALING APPARATUS

[76] Inventor: Bradley H. Buchanan, One Sola Ave., San Francisco, Calif. 94116

[21] Appl. No.: 673,821

[22] Filed: Nov. 21, 1984

Related U.S. Application Data

[63] Continuation of Ser. No. 256,963, Apr. 23, 1981, abandoned.

[51] Int. Cl.⁴ .............................................. B32B 31/18
[52] U.S. Cl. ..................................... 156/515; 156/251; 156/256; 156/267; 156/324; 156/516; 156/530
[58] Field of Search ............... 156/250, 251, 261, 267, 156/515, 516, 517, 518, 530, 243, 324, 494, 256; 493/194, 203, 209

[56] References Cited

U.S. PATENT DOCUMENTS

| | | | |
|---|---|---|---|
| 3,868,291 | 2/1975 | Benz et al. | 156/530 |
| 4,000,029 | 12/1976 | Michaels | 156/583.4 |
| 4,256,024 | 3/1981 | Carlisle | 156/251 |
| 4,285,681 | 8/1981 | Walitalo | 493/209 |
| 4,430,069 | 2/1984 | Carlisle | 493/209 |

*Primary Examiner*—Caleb Weston
*Attorney, Agent, or Firm*—Phillips, Moore, Lempio & Finley

[57] ABSTRACT

An apparatus for forming an article out of superimposed heat-sealable panels comprises a conveyor for moving a pair of superimposed webs along a path and into a cutting and sealing station whereat the panels are cut out of the webs and simultaneously heat-sealed together. The simultaneous cutting and sealing steps are effected by a unitary die having a cutting die that is heated to a predetermined cutting temperature and a sealing die that is heated to a predetermined sealing temperature that is substantially lower than the cutting temperature. The apparatus also includes steering means for automatically shifting a belt of the conveyor to maintain it in proper alignment and a scrap removal station for removing the web after the cutting and sealing operation.

21 Claims, 19 Drawing Figures

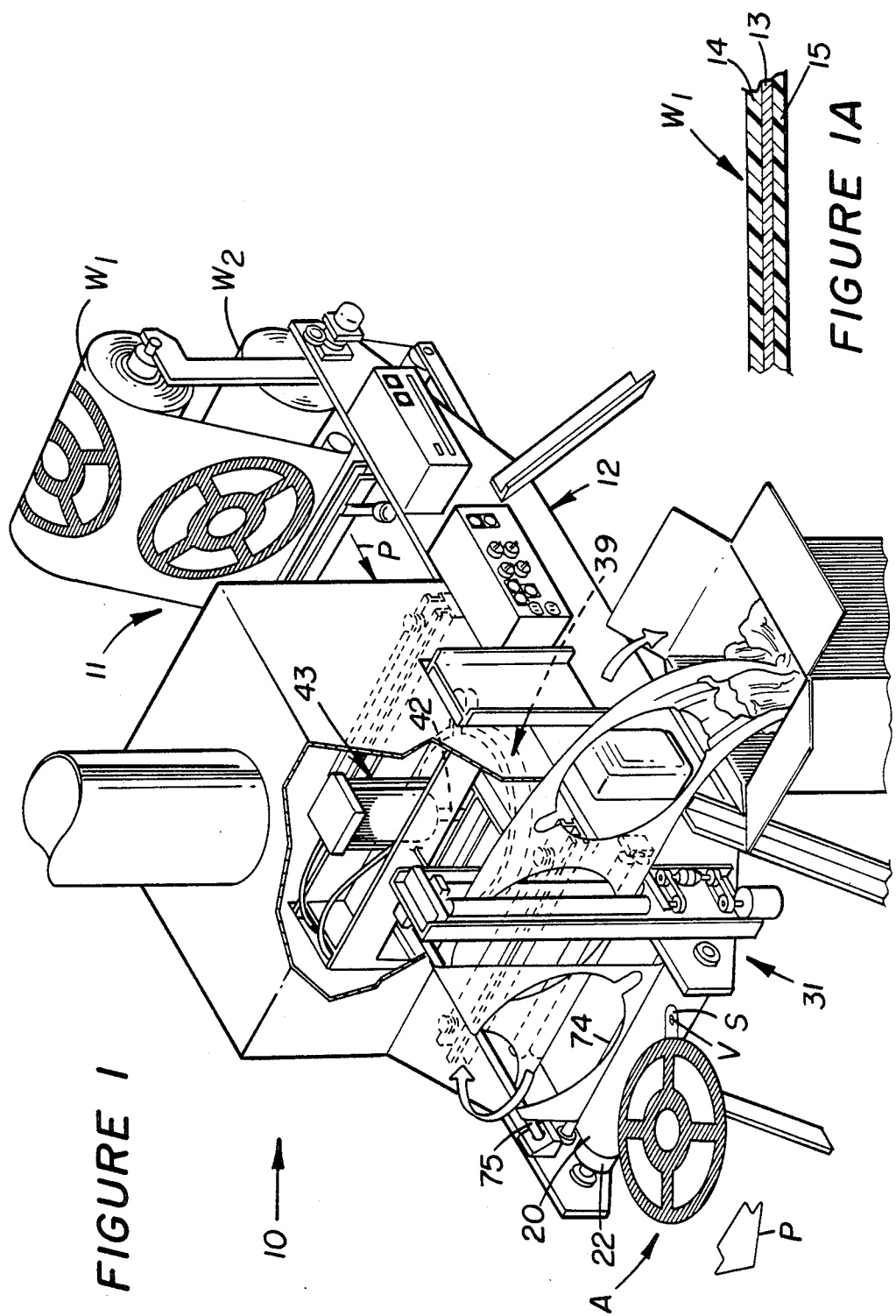

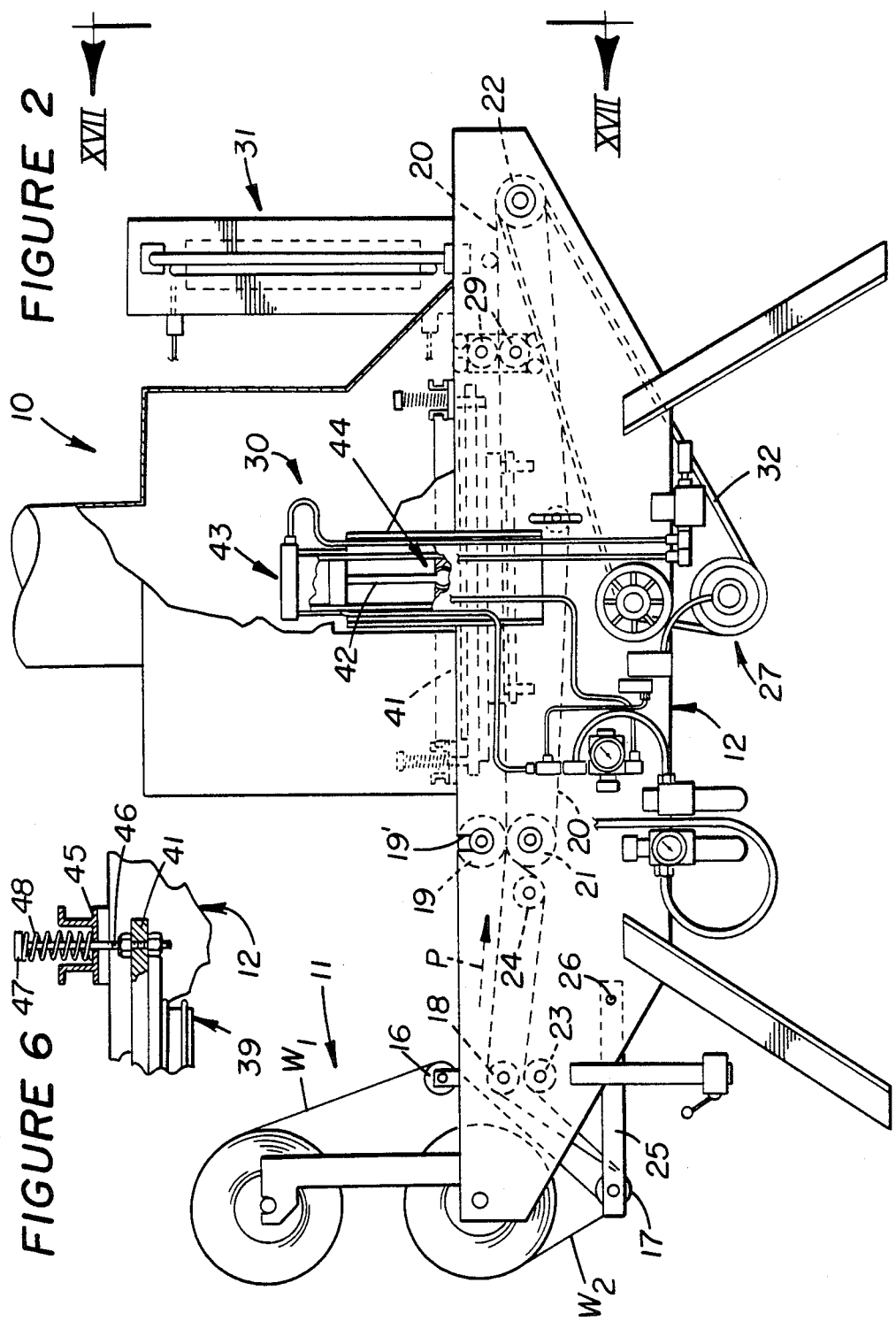

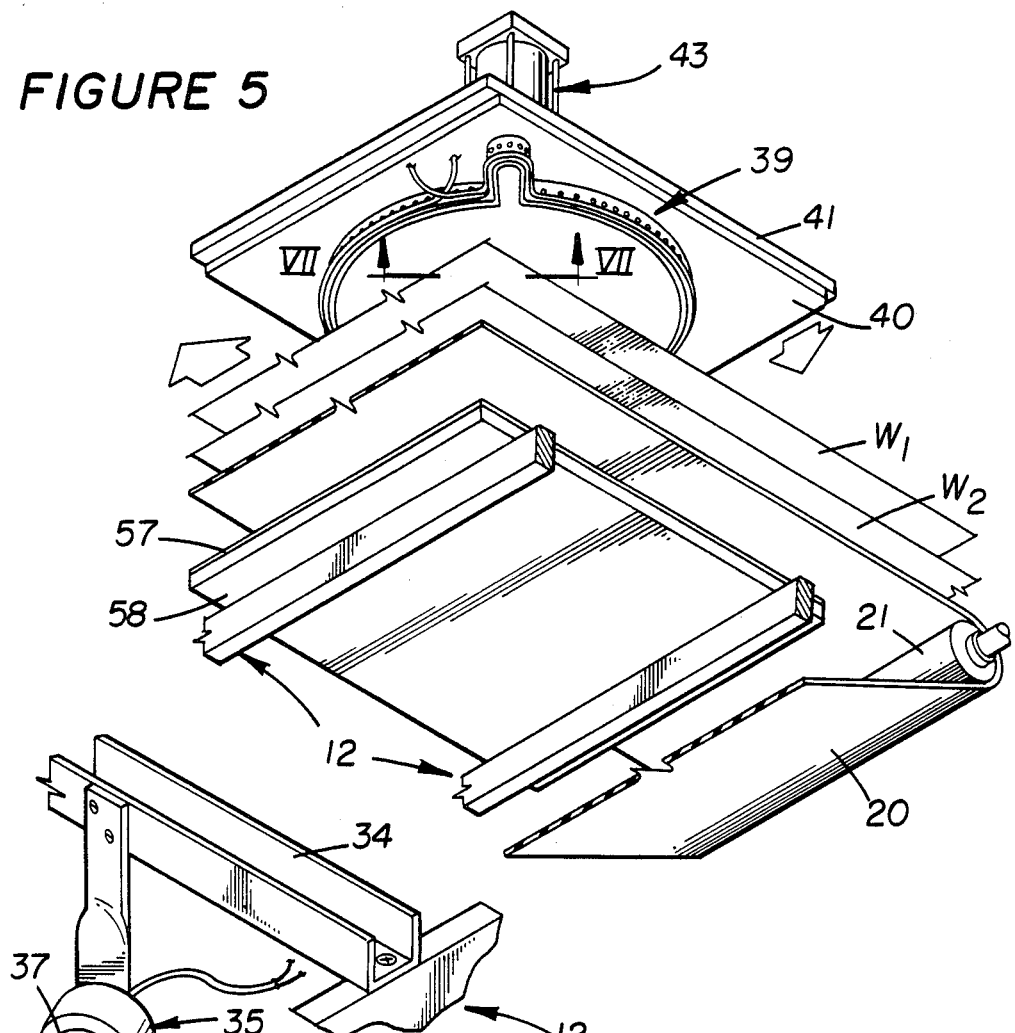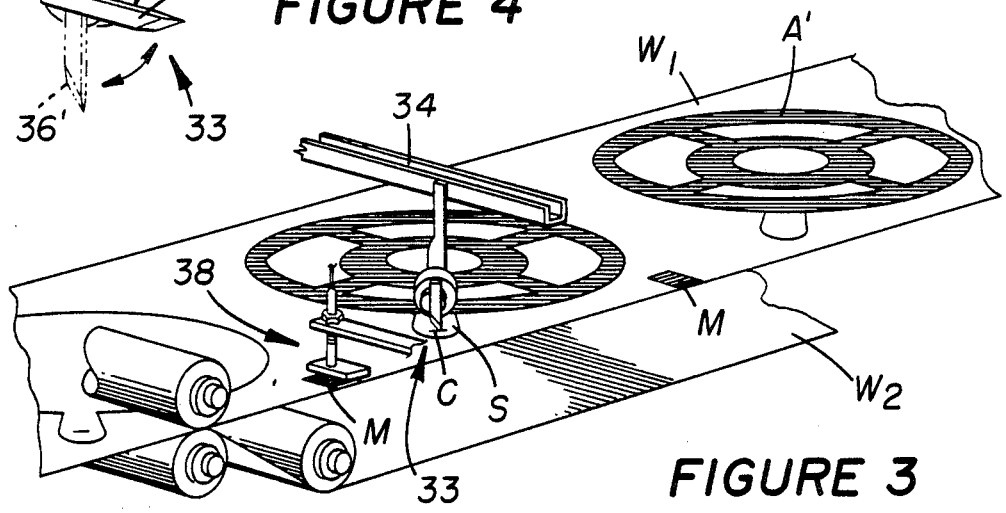

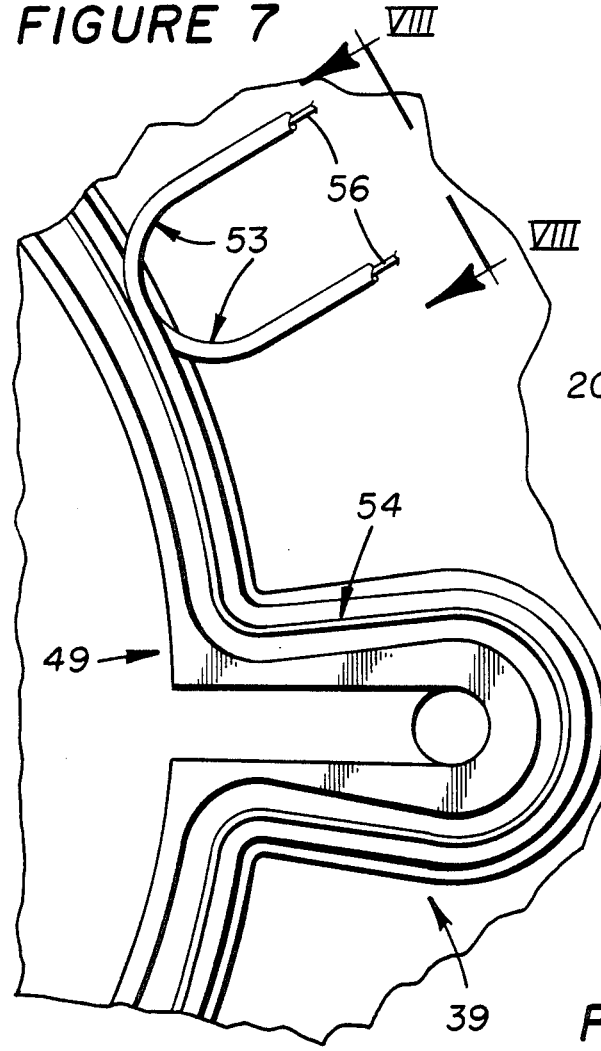
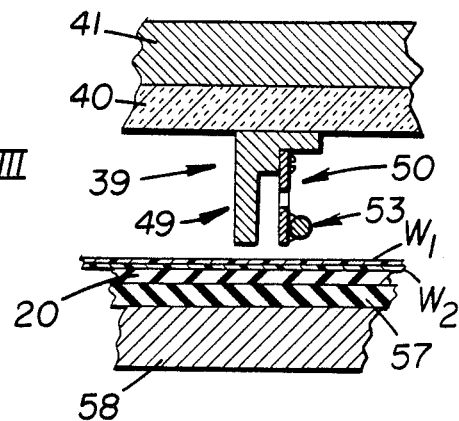
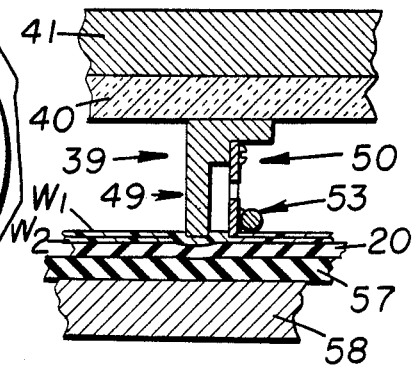
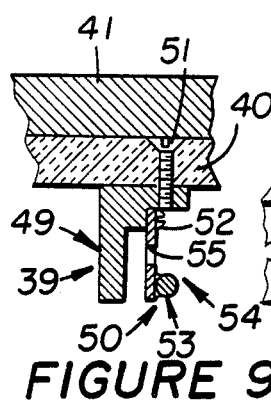
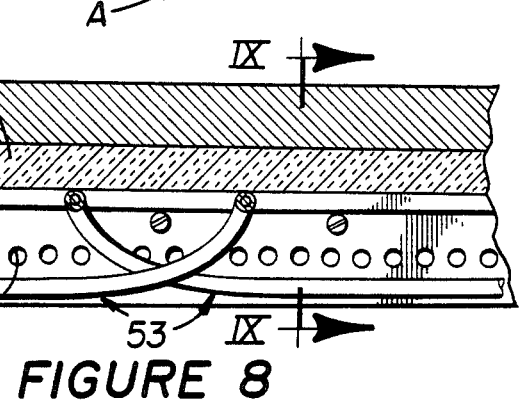

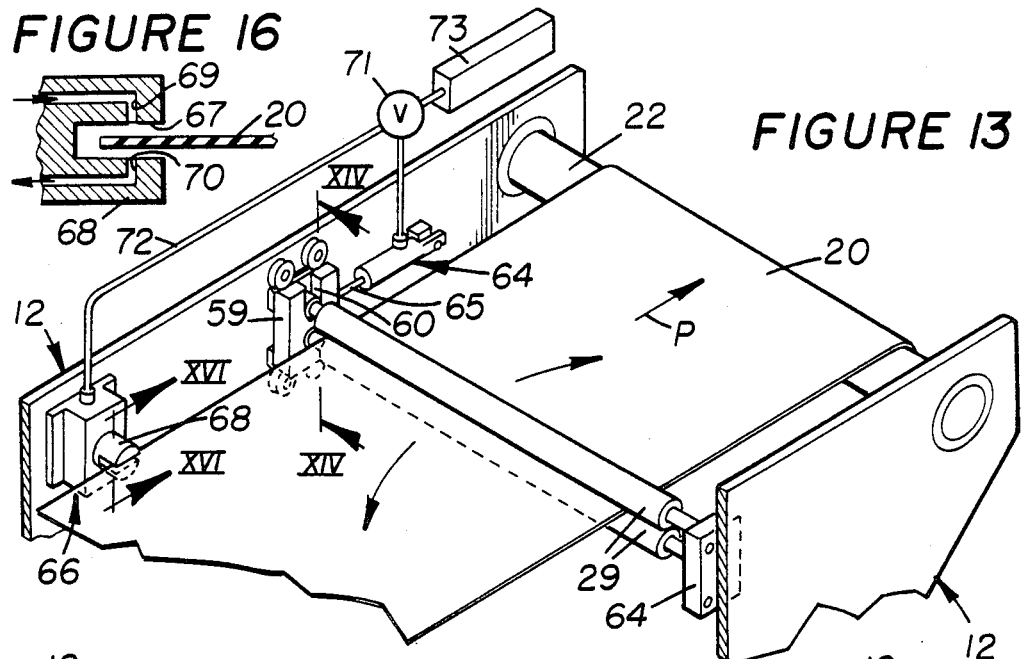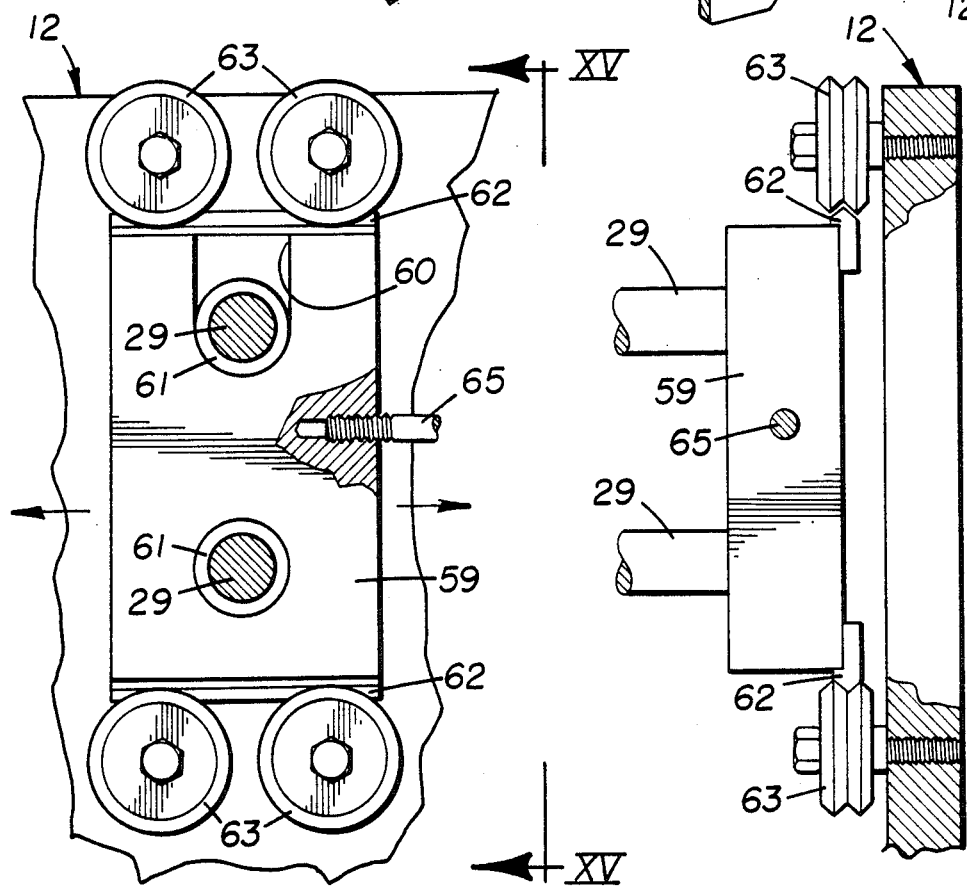

HEAT CUTTING AND SEALING APPARATUS

TECHNICAL FIELD

This is a continuation of Ser. No. 256,963, filed Apr. 23, 1981, now abandoned.

This invention relates generally to an apparatus and method for forming an article out of a pair of superimposed heat-sealable panels and more particulary to the formation of such article by a unitary cutting and sealing die that performs the cutting operation at a substantially higher temperature than the temperature employed for the sealing operation.

BACKGROUND ART

The advent of heat-sealable plastic coatings, such as polyethylene, has given rise to the formation of various articles composed of superimposed panels that are heat-sealed together simultaneously with a cutting process. For example, U.S. Pat. No. 4,077,588 discloses toy balloons that are generally formed in the above manner. However, conventional apparatus and methods for forming articles of this type exhibit various problems, such as the inability to maintain the superimposed panels in precise alignment and to continuously ensure efficient sealing of the panels together to prevent subsequent leakage.

DISCLOSURE OF INVENTION

An object of this invention is to provide heat cutting and sealing apparatus and a method for efficiently and simultaneously cutting and sealing a pair of superimposed heat-sealable panels together. The apparatus includes a conveyor for moving a pair of superimposed webs into a cutting and sealing station which includes a unitary cutting and sealing die means for simultaneously cutting the webs at a predetermined cutting temperature to define a pair of superimposed heat-sealable panels and heat sealing the panels together at a predetermined sealing temperature that is substantially lower than the cutting temperature, to form an article. The method herein includes the step of conducting a portion of the cutting temperature to provide the sealing temperature.

Another object of this invention is to provide a steering means for automatically shifting a belt of the conveyor to constantly maintain it in proper alignment.

Still another object of this invention is to provide a scrap removal station for efficiently removing the scrap web from the apparatus, subsequent to formation of the article.

The cutting and sealing die preferably comprises a heat conductive sealing die, a heat-conductive cutting die secured to the sealing die, heating means secured to the cutting die for heating it to the predetermined cutting temperature, and means for impeding the conduction of heat from the heating means to the sealing die to reduce the sealing temperature substantially below that of the cutting temperature.

BRIEF DESCRIPTION OF THE DRAWINGS

Other objects and advantages of this invention will become apparent from the following description and accompanying drawings wherein:

FIG. 1 is an isometric view illustrating an apparatus for forming articles with portions thereof broken-away to expose a cutting sealing station employed therein;

FIG. 1A is a sectional view of a composite laminate adapted to be used for forming the articles;

FIG. 2 is a side elevational view of the apparatus with a portion thereof broken-away;

FIG. 3 partially illustrates a conveyor employed in the apparatus for moving and superimposing a pair of webs and a device for forming a slit in one of the webs;

FIG. 4 is an isometric view more clearly illustrating the slitting device;

FIG. 5 is an exploded, isometric view illustrating a cutting and sealing die mounted above the webs and conveyor in the cutting and sealing station of the apparatus;

FIG. 6 is an enlarged, partially sectioned view illustrating one of a plurality of support and spring assemblies for mounting the cutting and sealing die on a frame of the apparatus;

FIG. 7 is an enlarged and partial bottom plan view of the cutting and sealing die, taken generally in the direction of arrows VII—VII in FIG. 5;

FIG. 8 is an enlarged side elevational view, generally taken in the direction of arrows VIII—VIII in FIG. 7, but shown in a reversed or upright position for clarification purposes;

FIG. 9 is a sectional view through the cutting and sealing die, taken in the direction of arrows IX—IX in FIG. 8;

FIGS. 10 and 11 sequentially illustrate the lowering of the cutting and sealing die into engagement with the superimposed webs to cut and heat seal a pair of panels defined therefrom;

FIG. 12 illustrates a sealed and cut portion of an article composed of the pair of panels;

FIG. 13 is a partial isometric view illustrating steering means for automatically shifting a belt of the conveyor to maintain it in proper alignment;

FIG. 14 is an enlarged and partially sectioned elevational view of a movable block employed in the steering means to mount a pair of rolls thereon, and taken generally in the direction of arrows XIV—XIV in FIG. 13;

FIG. 15 is an end elevational view, taken in the direction of arrows XV—XV in FIG. 14, of the movable block and its slidable mounting on a frame of the apparatus;

FIG. 16 is an enlarged sectional view through a head of a sensor unit of the steering means, taken in the direction of arrows XVI—XVI in FIG. 13, for sensing the position of an edge of the belt;

BEST MODE OF CARRYING OUT THE INVENTION

General Description

Figures 17, 18:
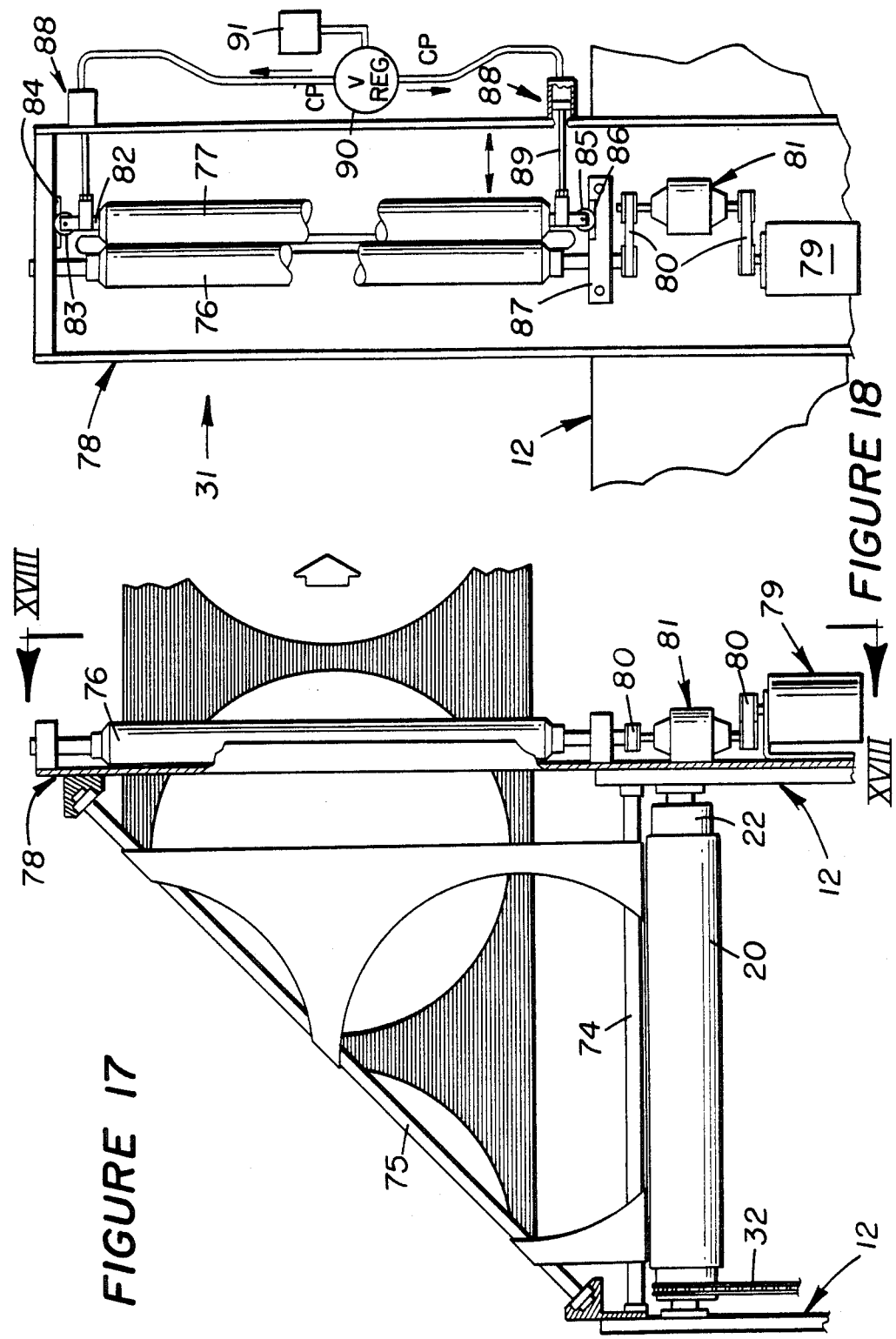
FIG. 17 is an enlarged end elevational view of a scrap removal station for removing the scrap web from the apparatus after the cutting and sealing operation, the view being taken in the direction of arrows XVII—XVII in FIG. 2.
FIG. 18 is a side elevational view of the scrap removal station, taken in the direction of arrows XVIII—XVIII in FIG. 17.

FIG. 1 illustrates an apparatus 10 for forming an article A out of a pair of superimposed and heat-sealable panels which are cut-out of a pair of webs W1 and W2 fed into the apparatus at a feeding station 11. As shown, the webs may be in roll-form and suitably mounted on a stationary frame 12 for continuous feeding of the webs through the apparatus in a manner hereinafter described. As shown in FIG. 1A, each web may comprise an inner layer 13 of metal, such as aluminum, and outer and inner layers 14 and 15, respectively, which form a composite laminate with inner layer 13.

Composite laminates of this type are well known in the art, as exemplified by those disclosed in above-referenced U.S. Pat. No. 4,077,588, and have application to composite structures, such as toy balloons, wherein a pair of laminated panels formed out of webs W1 and W2 are heat-sealed at their peripheries to form the article. Outer and inner layers 14 and 15 may constitute a plastic coating, such as polyethylene, with inner layer 15, in particular, being heat sensitive to reactivate (melt) at temperatures approximating 300° F., for example. Although the apparatus and method disclosed and claimed herein have particular application to the cutting and heat sealing of composite laminates of the above type, it should be understood that this invention has other applications, such as in the packaging arts wherein carton panels are cut and secured together.

FEEDING STATION 11

Referring to FIG. 2, weg W1 is entrained over an idler roll 16, under an idler roll 17, over an idler roll 18, and under a "floating" pinch or nip roll 19. As shown, each end of the rotating axle for roll 19 is mounted in a vertical slot formed on frame 12 to compensate for inch thickness variations and to hold the web on an endless conveyor belt 20 which is mounted on a pair of longitudinally spaced feed rolls 21 and 22. Web W2 is entrained over web W1 and roll 17, over an idler roll 23, under an idler roll 24, and between web W1 and conveyor belt 20. Roll 17 may be weighted and rotatably mounted on an end of a lever 25 that is pivotally mounted on frame 12 by a pivot pin 26. Weighted roll 17 will thus aid in tensioning webs W1 and W2 under the influence of gravity so that they are free of any wrinkles or the like when transferred between pinch rolls 19 and 21 and onto conveyor belt 20.

An intermittently-operated electric drive motor 27 with a constant torque functions to intermittently drive roll 22 and thus conveyor belt 20, via an endless chain 28, to move belt 20 and superimposed webs W1 and W2 along a linear path P. The belt moves between a pair of pinch or guide rolls 29 which are movably mounted on frame 12 to provide steering means for automatically shifting the belt laterally to maintain it in proper alignment, as described hereinafter in reference to FIGS. 13–16. After the webs have been moved through a cutting and sealing station 30, a scrap removal station 31, hereinafter described, functions to discharge waste material from the apparatus (FIGS. 1, 17, and 18).

Slitting Device 33

Referring once again to FIG. 1, article A may have a stem or neck S formed integrally therewith to have a standard valve V secured thereon for filling the article or balloon with gas, such as helium. FIGS. 3 and 4 illustrate a slitting device 33, mounted on a stationary cross-bar 34 secured on frame 12 of the apparatus, for forming a slit or cut C in stem S, on that portion of the article defined on web W1. Device 33 may comprise a rotary solenoid 35 having a blade 36 secured on a rotary shaft 37 of the solenoid. As shown in FIG. 4, apparatus 10 is suitably programmed to intermittently stop webs W1 and W2, whereby solenoid 35 will be actuated to pivot blade 36 downwardly to its 36' position to form cut C in web W1. A suitable conventional control system (not fully shown) may include a photocell 38 mounted on the frame of the apparatus to actuate solenoid 35 in response to detection of a marking M on web W1 by the photocell.

Cutting and Sealing Station 30

Referring to FIGS. 5–9, superimposed webs W1 and W2 are moved under a cutting and sealing die 39 in station 30 by conveyor belt 20 and feed or device roll 22, which rotates at a synchronized speed relative to the linear movements of the conveyor belt. The intermittently-run conveyor belt will stop under the cutting and sealing die to precisely locate it over the outline or color print of article A, as depicted by A' on web W1 in FIG. 3. Cutting and sealing die 39 essentially functions to simultaneously cut webs W1 and W2 at a predetermined cutting temperature to define the panels, composing article A, and to simultaneously heat seal the panels together at a predetermined sealing temperature that is substantially lower than the cutting temperature to form the article.

As shown in FIGS. 5 and 8, die 39 is suitably secured beneath a thermo-insulating pad or panel 40 which is, in turn, secured beneath a steel support plate 41 by a plurality of bolts or the like (not shown). Pad 40 may be composed of a rigid insulating material, such as Maranite, manufactured by Johns-Manville. The primary purpose of insulating pad 40 is to thermally isolate die 39 to prevent conduction of heat from the die to steel support plate 41.

As shown generally in FIGS. 1 and 2, a rod 42 of a double-acting air cylinder 43 is connected to plate 41 at a universal connection 44, such as a ball and socket, to reciprocate die 39 between its retracted position, illustrated in FIG. 10, and its operative or cutting and sealing position, illustrated in FIG. 11. Operation of air cylinder 43 is, of course, suitably controlled by the overall control system for apparatus 10 in a conventional manner. The housing of the air cylinder is suitably secured on the frame of the apparatus in a rigid manner to precisely reciprocate die 39 between its retracted and operative positions. Universal connection 44 is "self-centering" to ensure that the die is uniformly engaged on the conveyor belt.

Referring to FIGS. 2 and 6, a plurality of support and spring assemblies may be employed to aid universal connection 44 in self-aligning die 39 on frame 12 of the apparatus for precisely engaging the die on the conveyor belt during the cutting and sealing operation (FIGS. 10 and 11). A spring assembly may be mounted between a stationary crossbar 45, secured on frame 12 of the apparatus, and each corner of plate 41, as indicated in FIGS. 1 and 2. Referring to FIG. 6, each spring assembly may comprise a bolt 46 reciprocated in crossbar 45 and having one end secured to plate 41 and having a head 47 formed on the other end thereof. A compression coil spring 48 is mounted between crossbar 45 and head 47 of bolt 46 to aid in the self-aligning function.

Referring to FIGS. 7–9, die 39 comprises a heat conductive sealing die 49, having a generally inverted L-shaped cross-section, and a heat conductive cutting die 50 secured in cantilevered relationship on an outboard side of the sealing die to define a separation space or slot therebetween. As shown in FIG. 9, a plurality of circumferentially-spaced machine screws 51 may be utilized to secure sealing die 49 to pad 40, whereas a plurality of screws 52 may be utilized to secure the cutting die to the sealing die. Die 39 further comprises a heating means, shown in the form of a standard rod-like resistor or heating element 53, brazed or otherwise suitably secured on an outboard side and on a lower end of cutting die 50. The heating element can constitute the well-known RBN Series Tubular Heater, manufactured by Watlow Corp. of St. Louis, Mo.

One of the unique features of die 39 is the provision of means 54, interposed between resistor 53 and sealing die 49, for impeding the conduction of heat from the heating element and the cutting die to the sealing die to reduce the sealing temperature of the sealing die substantially below the cutting temperature of the cutting die. For example, whereas the cutting temperature may be in the 500°-650° F. range, the sealing temperature may be in the range of from 300°-400° F. The lowered sealing temperature will ensure that adequate sealing and securance of webs W1 and W2 is effected without cutting or otherwise damaging the webs to further ensure that the article will be formed as a sealed and gastight envelope.

Means 54 may include a plurality of holes 55 which are formed through cutting die 50, in the heat conductive path between heating element 53 and sealing die 49. As will be appreciated by those skilled in the arts relating hereto, the number, size, and positioning of the holes may be closely controlled and predetermined to effect the desired cutting and sealing temperatures. Other design parameters which must be considered would include the material composing the cutting and sealing dies, the dimensional parameters of the dies, and the radial spacing or slot defined between the dies (FIG. 9). The dies may be composed of steel, for example, to provide the desired heat conductive qualities and yet provide the desired structural properties to ensure a long service life after repeated use.

Although die 39 is shown as being generally annular, it should be understood that other configurations, such as rectangular, could be utilized without departing from the spirit and scope of this invention. As shown in FIG. 7, the die may be configured in odd shapes, such as a shape accomodating the configuration of stem S of article A (FIG. 1). As further shown in FIG. 7, opposite ends 56 of heating element 53 can be suitably connected to a power source (not shown) which is integrated into the overall control system of the apparatus for charging the resistive-type heating element with electricity during the cutting and sealing process.

Referring to FIGS. 10-12, during the cutting and sealing operation cylinder 43 (FIG. 1) will be extended to move die 39 into engagement with superimposed webs W1 and W2 to form article A by precisely cutting the article out of the webs at composite edge E (FIG. 12) and simultaneously forming a weld joint or seam J, inwardly of the edge. As shown in FIG. 11, the cutting and sealing dies, which may have identical lengths, move downwardly into engagement with the webs to uniformly compress and slightly elastically deform conveyor belt 20 and an underlying statitonary back-up pad 57 which is secured on a steel plate 58, in turn secured to frame 12 of the apparatus. As indicated above, universal connection 44 (FIG. 2) with the spring assemblies supporting die 39 aid in the uniform and precise engagement of the die on the conveyor belt. Belt 20 and pad 57 may be composed of a semi-rigid elastomeric material having a Shore hardness in the range of 30, for example. In actual application, the belt and pad were each composed of a fiberglass composition suitably impregnated with a silicone rubber to effect the desired Shore hardness.

Steering Means for Belt 20

Referring to FIGS. 13-16, the steering means for automatically shifting belt 20 to maintain in it proper alignment with path P comprises adjustable rolls 29 and attendant controls. Rolls 29 are preferably coated with an elastomer, such as a suitable rubber-based material, with first ends of the rolls being rotatably mounted on a movable block 59. If so desired, the axle end of the upper roll may be mounted in a lost-motion slot 60 formed in block 59 to compensate for any irregularities in the thickness of the web during feeding of the conveyor belt and web through the rolls. As further shown in FIG. 14, the axle end of each roll is mounted in a spherical bearing assembly 61 to provide limited universal movement of the axles relative to the block.

As shown in FIGS. 14 and 15, an elongated, wedge-shaped track 62 is secured to the upper and lower ends of the block to engage a pair of longitudinally spaced guide wheels 63, rotatably mounted on frame 12 of the apparatus. Block 59 is thus adapted for limited longitudinal movements relative to the frame, whereby the conveyor belt can be shifted laterally to maintain it in proper alignment relative to linear path P. As shown in FIG. 13, the opposite axle ends of rolls 29 are suitably mounted in a stationary block 64, secured to frame 12, by spherical bearing assemblies (not shown) to also permit limited universal movement of these ends of the rolls.

Still referring to FIG. 13, sliding movement of block 59 is responsive to automatic actuation of control means, shown in the form of an air cylinder 64 having a reciprocal rod 65 secured to the block. Actuation of air cylinder 64, which may be spring-biased in the generally rightward direction in FIG. 13 and air-actuated in the opposite direction, is responsive to a standard edge sensor unit or sensing means 66, secured on the frame of the apparatus. As shown in FIG. 16, a slot 67 is formed in a head 68 of the sensor unit to continuously detect the location of an edge of conveyor belt 20 relative thereto. In particular, edge sensor unit 66 includes an air supply passage 69 which continuously ejects an air stream towards air pickup passage 70. When the edge of conveyor belt 20 is properly positioned to block the ejection of air from passage 69 and into passage 70, block 59 will remain relatively stationary. However, should the edge of the conveyor belt move rightwardly in FIG. 16 and into a non-blocking blocking position between the passages, air ejected from passage 69 will be picked-up by passage 70 to actuate air cylinder 64 to extend rod 65 thereof to askew rolls 29 relative to path P. Due to the frictional engagement between the steering rolls and elastomeric belt, the conveyor belt will again move towards its FIG. 16 and properly aligned position, parallel to the path.

Edge sensor unit 66, which may be of the type manufactured by Aro Corporation of Bryan, Ohio (Part No. 59821-5), includes a pneumatic amplifier (not shown) therein which will communicate an amplified air signal to cylinder 64 to actuate it in the above-described manner. As schematically illustrated in FIG. 13, the amplified air signal is communicated to a standard air valve 71, via a conduit 72, to open the valve and communicate a pressurized air source 73 to air cylinder 64. As suggested above, when the amplified air signal falls between a predetermined pressure level, the valve will close and the compression coil spring in air cylinder 64 will return block 59 and rolls 29 to their desired positions.

Scrap Removal Station 31

FIGS. 1, 17, and 18 illustrate scrap removal station 31 for discharging the spent web of waste material from the apparatus after articles A have been formed. The scrap removal station includes take-up roll means comprising a roll 74, rotatably mounted on frame 12 and positioned slightly upstream of roll 22, for receiving the scrap web thereunder and directing it upwardly at an angle approximately ninety degrees relative to conveyor belt 20. The scrap web is then entrained over a roll 75, disposed at an acute angle approximating forty-five degrees, for example, relative to roller 74, for turning and reverse folding the web forty-five degrees and transversely through a pair of vertically disposed drive rolls 76 and 77. As more clearly shown in FIG. 18, the drive rolls are rotatably mounted on a bracket assembly 78, secured on a side of frame 12, and roll 76 is driven continuously by an electric drive motor 79 via belts 80 and an electromagnetic clutch 81 of standard design.

The clutch will apply a constant torque to roll 76, independent of the continuous speed of motor 79. In particular, the clutch will ensure that a constant torque to roll 76, independent of the continuous speed of motor 79. In particular, the clutch will ensure that a constant torque will be applied to roll 76 throughout the feeding of the scrap web through rolls 76 and 77. As further shown in FIG. 18, roll 77 is rotatably mounted on an axle 82 having a roller 83 rotatably mounted on an upper end thereof to engage a track 84, secured on bracket assembly 78. A lower end of axle 82 has a second roller 85 rotatably mounted thereon to engage a groove 86, defined in a bracket 87 secured on bracket assembly 78.

Thus, roller 77 is adapted to move towards and away from roller 76 in parallel relationship therewith to accomodate webs of various thicknesses. A pair of air cylinders 88 each have a rod 89 secured to axle 82 to constantly apply a uniform pressure to the functionally engaged scrap web through roll 77. The preselected constant air pressure maintained in the air cylinders to bias roll 77 towards roll 76 is under control of a standard constant pressure air regulator 90, connected to a pressurized air source 91. In summary, electro-magnetic clutch 81 will apply a constant torque to roll 76 during machine operation to allow precise control of the tension of the scrap web to prevent breaking thereof, whereas air cylinders 88 will apply a constant pressure to the scrap web, between rolls 76 and 77, to allow the scrap web to be fed through the rolls even though the thickness thereof may vary.

Industrial Applicability

Apparatus 10 is particularly adapted for the semi-continuous formation of articles A, shown in the form of a balloon adapted to be filled with helium or the like through a valve V. As shown in FIGS. 1 and 2, webs W1 and W2 are fed in sheet form to be superimposed on conveyor belt 20, whereby they are transported into cutting and sealing station 30. Upon stopping of the intermittently-run conveyor belt, air cylinder 43 will be extended to move die 39 into engagement with the webs, as shown sequentially in FIGS. 10 and 11.

As shown in FIG. 12, cutting die 50 will effect a clean cut at edge E and a gas-tight seal will be formed around the article, as indicated by weld joint or seam J. As further shown in FIG. 11, the fact that the cutting die has a substantially smaller thickness and is heated to a greater temperature than the sealing die aids in effecting the desired cutting and sealing steps. In one specific application, cutting die 50 has a thickness of 0.062 in., sealing die 49 had a thickness of 0.312 in., and the two dies were separated by a radial distance of 0.25 in. In addition, the slot separating the dies (FIG. 9) had a depth of 0.813 in. and die 39 had an overall height of 1.25 in. As suggested above, the design parameters for die 39 will change depending on the particular application for which it is used. For example, the die could be constructed to utilize more than one cutting and/or sealing die.

The ability of the composite die to closely control the temperature gradient across the respective cutting and sealing dies is one generic concept to which this invention is directed. Other aspects of this invention include the steering means comprising adjustable rolls 29 and scrap removal station 31 for efficiently removing the scrap web after the articles have been formed.

I claim:

1. In an apparatus for forming an article out of a pair of superimposed heat-sealable panels comprising conveyor means for moving a pair of superimposed webs along a path and a cutting and sealing station for receiving said webs including unitary cutting and sealing die means for simultaneously cutting said webs at a predetermined cutting temperature to define said panels and heat sealing said panels together at a predetermined sealing temperature that is substantially lower than said cutting temperature to form said article, said die means including a vertically disposed heat conductive sealing die, a vertically disposed heat conductive cutting die having an upper end portion thereof directly secured solely to said sealing die in heat conducting relationship therewith, heating means directly secured only to a lower end portion of said cutting die for heating it to said predetermined cutting temperature and control means formed in said cutting die between the upper and lower end portions thereof for impeding and simultaneously controlling the conduction of heat composing said cutting temperature from said heating means, upwardly through said cutting die and to said sealing die to create said sealing temperature.

2. The apparatus of claim 1 further comprising means for reciprocating said die means between a retracted position out of engagement with said webs and a self-centering and operative cutting and sealing position engaging said webs.

3. The apparatus of claim 2 wherein said means for reciprocating said die means includes a support having said die means secured thereunder and a double-acting cylinder universally connected to said support.

4. The apparatus of claim 3 wherein said support includes a plate and a thermo-insulating pad means secured directly between said plate and said sealing die for thermally insulating said die means from said plate.

5. The apparatus of claim 1 wherein said control means comprises a plurality of holes formed through said cutting die.

6. The apparatus of claim 1 wherein the upper end portion of said cutting die is secured on an outboard side of said sealing die in cantilevered relationship thereon to define a separation and air space between said sealing die and the lower end portion of said cutting die.

7. The apparatus of claim 1 wherein said heating means comprises an electrical heating element secured on a outboard side of the lower end portion of said cutting die.

8. The apparatus of claim 1 wherein each of said sealing and cutting dies are each generally annular.

9. The apparatus of claim 1 wherein said conveyor means includes endless belt means, composed of an elastomeric material, for elastically deforming upon its engagement with said die means, said belt means underlying said die means.

10. The apparatus of claim 9 further comprising a stationary back-up plate disposed beneath said die means and an elastomeric pad secured on said plate and disposed between said plate and said belt means.

11. The apparatus of claim 1 further comprising a scrap removal station including take-up roll means rotatably mounted on said apparatus for removing said webs from said apparatus after said article has been formed in said cutting and sealing station.

12. The apparatus of claim 11 wherein said take-up roll means includes means for controlling the tension of said webs.

13. The apparatus of claim 11 further comprising first drive means for driving said conveyor means intermittently and second drive means for driving a pair of rolls and of said take-up roll means continuously and under a constant torque.

14. The apparatus of claim 1 further comprising means for placing said webs under a predetermined tension during movement thereof along said path.

15. The apparatus of claim 1 further comprising steering means for automatically shifting said conveyor means to continuously maintain its alignment with said path.

16. The apparatus of claim 1 further comprising means for forming a slit in one of said webs prior to movement of said webs into said cutting and sealing station.

17. A combined cutting and sealing die comprising
a vertically disposed heat conductive sealing die,
a vertically disposed heat conductive cutting die having an upper end portion thereof directly secured to said sealing die in heat conducting relationship therewith,
heating means directly secured only to a lower end portion of said cutting die for heating it to a predetermined cutting temperature, and
control means formed in said cutting die between the upper and lower end portions thereof for impeding and simultaneously controlling the conduction of heat composing said cutting temperature from said heating means upwardly through said cutting die and to said sealing die to reduce the sealing temperature of said sealing die substantially below the cutting temperature of said cutting die.

18. The die of claim 17 wherein said control means comprises a plurality of holes formed through said cutting die.

19. The die of claim 17 wherein the upper end portion of said cutting die is secured on an outboard side of said sealing die in cantilevered relationship thereon to define a separation and air space between said sealing die and the lower end portion of said cutting die.

20. The die of claim 17 wherein said heating means comprises an electrical heating element secured on an outboard side of the lower end portion of said cutting die.

21. The die of claim 17 wherein each of said sealing and cutting dies are each generally annular.

* * * * *